(12) United States Patent
Otsuka et al.

(10) Patent No.: US 12,046,218 B2
(45) Date of Patent: Jul. 23, 2024

(54) IMAGE PROCESSING APPARATUS AND IMAGE PROCESSING METHOD

(71) Applicant: Sony Interactive Entertainment Inc., Tokyo (JP)

(72) Inventors: Katsushi Otsuka, Tokyo (JP); Masakazu Tanikawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 74 days.

(21) Appl. No.: 17/908,077

(22) PCT Filed: Mar. 18, 2021

(86) PCT No.: PCT/JP2021/011135
§ 371 (c)(1),
(2) Date: Aug. 30, 2022

(87) PCT Pub. No.: WO2021/193362
PCT Pub. Date: Sep. 30, 2021

(65) Prior Publication Data
US 2023/0086916 A1 Mar. 23, 2023

(30) Foreign Application Priority Data
Mar. 26, 2020 (JP) .................. 2020-056530

(51) Int. Cl.
*G09G 5/12* (2006.01)
(52) U.S. Cl.
CPC ....... *G09G 5/12* (2013.01); *G09G 2340/0435* (2013.01); *G09G 2360/18* (2013.01)

(58) Field of Classification Search
CPC .......... G09G 2320/10; G09G 2340/02; G09G 2340/0435; G09G 2354/00;
(Continued)

(56) References Cited

U.S. PATENT DOCUMENTS

| 5,721,590 A | * | 2/1998 | Sanpei | H04N 19/132 |
|---|---|---|---|---|
| | | | | 375/E7.211 |
| 6,354,278 B1 | | 3/2002 | Noriyuki | |

(Continued)

FOREIGN PATENT DOCUMENTS

| JP | 2001285577 A | 10/2001 |
|---|---|---|
| JP | 2001285877 A | 10/2001 |

(Continued)

OTHER PUBLICATIONS

Notice of Reasons for Refusal for corresponding JP Application No. 2020-056530, 11 pages, dated Feb. 16, 2023.
(Continued)

*Primary Examiner* — Hong Zhou
(74) *Attorney, Agent, or Firm* — Matthew B. Dernier, Esq.

(57) ABSTRACT

An image data acquirement section of an image processing apparatus acquires data regarding a frame of a moving image generated by a server. A decoding/decompression section repeats a cycle of a decoding/decompression process for each of frames at a rate higher than the frame rate of the moving image. An image processing section repeats a cycle of applying a necessary image process to each of the frames at the rate higher than the frame rate of the moving image. The display control section outputs the data regarding the frame ready for displaying to a display panel at the rate higher than the frame rate of the moving image.

16 Claims, 9 Drawing Sheets

(58) Field of Classification Search
CPC ...... G09G 2360/18; G09G 5/12; G06F 3/147; H04N 21/431; H04N 21/438
See application file for complete search history.

(56) References Cited

U.S. PATENT DOCUMENTS

| | | | |
|---|---|---|---|
| 6,469,744 B1* | 10/2002 | Pearlstein | G06F 3/14 |
| | | | 348/E7.015 |
| 7,062,149 B2 | 6/2006 | Seki | |
| 7,336,317 B2 | 2/2008 | Yui | |
| 8,593,575 B2 | 11/2013 | Horikoshi | |
| 2002/0041758 A1 | 4/2002 | Seki | |
| 2005/0105001 A1 | 5/2005 | Yui | |
| 2008/0239147 A1* | 10/2008 | Kung | H04N 21/4305 |
| | | | 348/E5.011 |
| 2012/0224105 A1 | 9/2012 | Horikoshi | |
| 2015/0229960 A1* | 8/2015 | Yamasaki | H04N 19/167 |
| | | | 375/240.12 |
| 2016/0180496 A1* | 6/2016 | Kasai | G06T 1/60 |
| | | | 345/545 |
| 2017/0006230 A1* | 1/2017 | Jeong | G09G 5/12 |
| 2017/0053620 A1* | 2/2017 | Law | G09G 5/395 |
| 2017/0078609 A1* | 3/2017 | Kim | H04N 19/423 |
| 2018/0160155 A1* | 6/2018 | Iguchi | H04N 21/8451 |
| 2019/0184284 A1* | 6/2019 | Quere | A63F 13/358 |

FOREIGN PATENT DOCUMENTS

| | | |
|---|---|---|
| JP | 2005124167 A | 5/2005 |
| JP | 2005338498 A | 12/2005 |
| JP | 2007300568 A | 11/2007 |
| JP | 2010206486 A | 9/2010 |
| JP | 20110107246 A | 6/2011 |
| JP | 2012182673 A | 9/2012 |

OTHER PUBLICATIONS

International Search Report for corresponding PCT Application No. PCT/JP2021/011135, 5 pages, dated Jun. 15, 2021.

* cited by examiner

FIG. 8
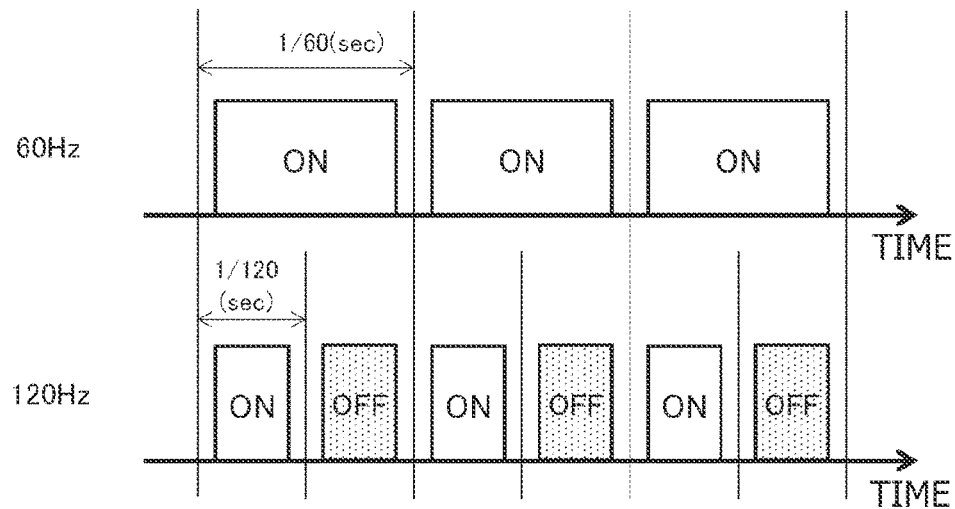
FIG. 9
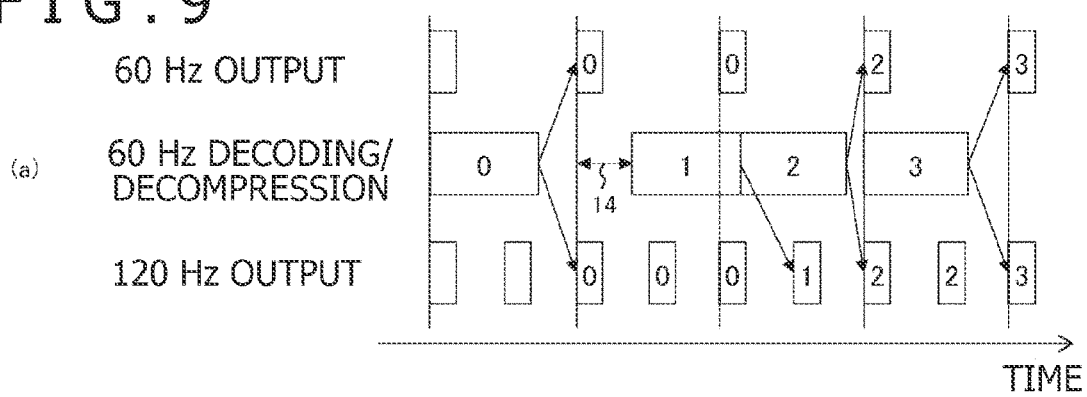
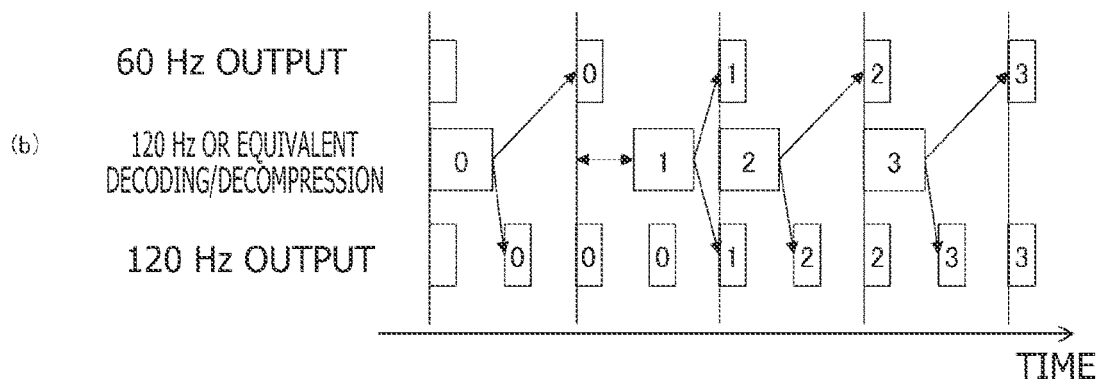

IMAGE PROCESSING APPARATUS AND IMAGE PROCESSING METHOD

TECHNICAL FIELD

The invention relates to an image processing apparatus and an image processing method that process data regarding a target to be displayed, or a moving image.

BACKGROUND ART

A recent improvement in an information processing technology and an image display technology has enabled experiencing a video world in various forms. For example, with a panorama image displayed on a head mount display, an image corresponding to the line of sight of a user is caused to appear, which enables enhancing a sense of immerse in a video world and improving operability of an application such as a game. In addition, image data transferred by streaming from a server having a lot of resources is displayed, which enables a user to enjoy a high-definition moving image or a game screen irrespective of a location or a size.

SUMMARY

Technical Problems

For a technology that causes data regarding an image transmitted over a network to immediately appear on a client terminal, communication between the client terminal and a server, a timing of a process in each of them, and a delay time dependent on a processing time may be of concern. For example, in reflecting a user operation in an image to be displayed on a client terminal side, coming and going of data, or sending of the user operation to a server and sending of image data to the client terminal from the server, is necessary and an unignorable delay time sometimes occurs. In a case where a head mount display is a destination for displaying, a delay of display relative to the motion of the head of a user may impair a sense of realism or cause a visually induced motion sickness. The problems are more likely to be surfaced with the pursuit of a higher picture quality.

The present invention has been made in view of such problems and an object thereof is to provide a technology that makes it possible to achieve picture quality and reduced delay time for image display requiring data transmission through communication.

Solution to Problems

To solve the above-described problems, an aspect of the present invention relates to an image processing apparatus. The image processing apparatus includes an image data acquirement section configured to acquire data regarding a frame constituting a moving image from an external device that is not integrally installed, an image processing section configured to cause the data regarding the frame to be ready for displaying by applying a predetermined process to the data, and a display control section configured to make reference to a frame rate of the moving image and provide more opportunities to output the data regarding the frame ready for displaying to a display panel than the frame rate of the moving image.

Another aspect of the present invention relates to an image processing method. In the image processing method, an image processing apparatus includes a step of acquiring data regarding a frame constituting a moving image from an external device that is not integrally installed, a step of causing the data regarding the frame to be ready for displaying by applying a predetermined process to the data, and a step of making reference to a frame rate of the moving image and providing more opportunities to output the data regarding the frame ready for displaying to a display panel than the frame rate of the moving image.

It should be noted that any combination of the above-described components and conversions of wordings of the present invention between a method, a device, a system, a computer program, a data structure, a recording medium, and the like are also acceptable as aspects of the present invention.

Advantageous Effects of Invention

According to the present invention, it is possible to achieve picture quality and reduced delay time for image display requiring data transmission through communication.

BRIEF DESCRIPTION OF DRAWINGS

FIG. 4 is a diagram schematically illustrating what processes from drawing to displaying of an image according to the present embodiment are like.

FIG. 8 is a diagram of assistance in explaining a processing time for each frame with a rate of a decoding/decompression process set higher than the frame rate of the moving image according to the present embodiment.

FIG. 9 is a diagram of assistance in explaining changes in display depending on various combinations of a rate of output to a display panel and the rate of the decoding/decompression process according to the present embodiment.

DESCRIPTION OF EMBODIMENT

Figure 1:
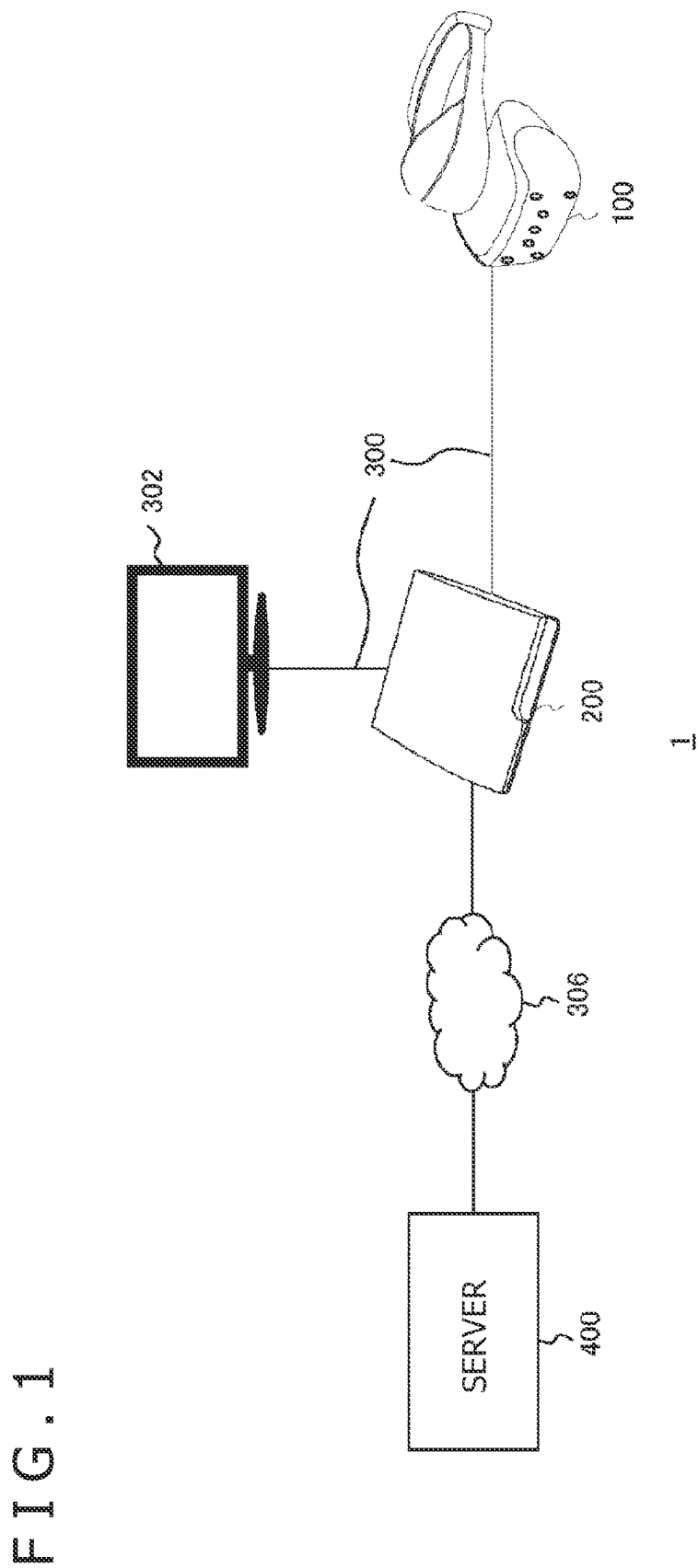
FIG. 1 is a diagram illustrating a configuration example of an image display system according to the present embodiment.

FIG. 1 illustrates a configuration example of an image display system according to the present embodiment. An image display system 1 includes an image processing apparatus 200, a head mount display 100, a flat panel display 302, and a server 400. The image processing apparatus 200 is connected to the head mount display 100 and the flat panel display 302 through wireless communication or an interface 300 such as a USB (Universal Serial Bus) Type-C or an HDMI (High-Definition Multimedia Interface)(registered trademark). The image processing apparatus 200 is also connected to the server 400 over a network 306 such as the Internet or LAN (Local Area Network).

The server 400 serves as an image data transfer device, generating and sending at least a part of an image to be displayed to the image processing apparatus 200. Here, the server 400 may be a server of a company or the like that provides various delivery services such as cloud gaming or an in-house server that sends data to any terminal. Accordingly, the network 306 may be a public network such as the Internet or a LAN without limitation in size. For example, the network 306 may be routed through a network of a mobile phone carrier, a Wi-Fi spot in a town, or a Wi-Fi access point spot in a house. Alternatively, the image processing apparatus 200 and the server 400 may be directly connected through a video interface.

The image processing apparatus 200 applies a necessary process to data regarding an image sent from the server 400 and outputs the data to at least one of the head mount display 100 and the flat panel display 302. For example, the server 400 receives motions of the heads or user operations of a plurality of users wearing respective head mount displays 100 from a plurality of image processing apparatuses 200 connected to the head mount displays 100. The server 400 then draws virtual worlds, which are changed in accordance with the user operations, in fields of vision corresponding to the motions of the heads of the respective users and sends them to the respective image processing apparatuses 200.

The image processing apparatuses 200 each convert sent data regarding an image to a form suitable for the head mount display 100 or the flat panel display 302, if necessary, and output the data to the head mount display 100 or the flat panel display 302 at an appropriate timing. Repetition of such a process for each frame of a moving image enables implementation of a cloud gaming system where a plurality of users are to participate.

At this time, the image processing apparatus 200 may output the image sent from the server 400 to the head mount display 100 or the flat panel display 302 after combining the image with a separately prepared UI (User Interface) plain image (or also referred to as OSD (On Screen Display) plain image) or an image captured by a camera of the head mount display 100.

In addition, the image processing apparatus 200 may correct the image sent from the server 400 on the basis of a position or an attitude of the head mount display 100 taken immediately before displaying, thereby enhancing followability of displaying relative to the motion of the head. The image processing apparatus 200 may also cause the flat panel display 302 to display an image in a similar field of vision, thereby allowing other people to see an image seen by a user who wears the head mount display 100.

However, the content of a moving image, or target to be displayed according to the present embodiment, and a destination for displaying it are not limited. For example, the server 400 may live-stream an image captured by a camera (not illustrated) as a target to be displayed to the image processing apparatus 200. At this time, the server 400 may acquire multi-view images of an event site, such as a sporting event or a concert, captured by a plurality of cameras and use them to create an image in a field of vision corresponding to the motion of the head mount display 100, thereby generating and delivering a multi-point-of-view live video to each of the image processing apparatuses 200.

In addition, a configuration of a system to which the present embodiment is applicable is not limited to illustrated one. For example, a display device connected to the image processing apparatus 200 may be either one of the head mount display 100 and the flat panel display 302 or a plurality of head mount displays 100 may be connected. In addition, the image processing apparatus 200 may be installed in the head mount display 100 or the flat panel display 302. For example, a flat panel display and an image processing apparatus may be integrated and provided in the form of a personal computer or a mobile terminal (a portable game machine, an intelligent mobile, or a tablet terminal).

At least one of the head mount display 100 and the flat panel display 302 may be further connected to these devices, if necessary. An input device (not illustrated) may be installed in or connected to the image processing apparatus 200 or these terminals. In addition, the number of the image processing apparatuses 200 connected to the server 400 is not limited, either. Further, the server 400 may receive the contents of operations of a plurality of users who are watching the respective flat panel displays 302 from the plurality of image processing apparatuses 200 connected to the flat panel displays 302, and generate images corresponding to the respective contents and send the images to the respective image processing apparatuses 200.

Figure 2:
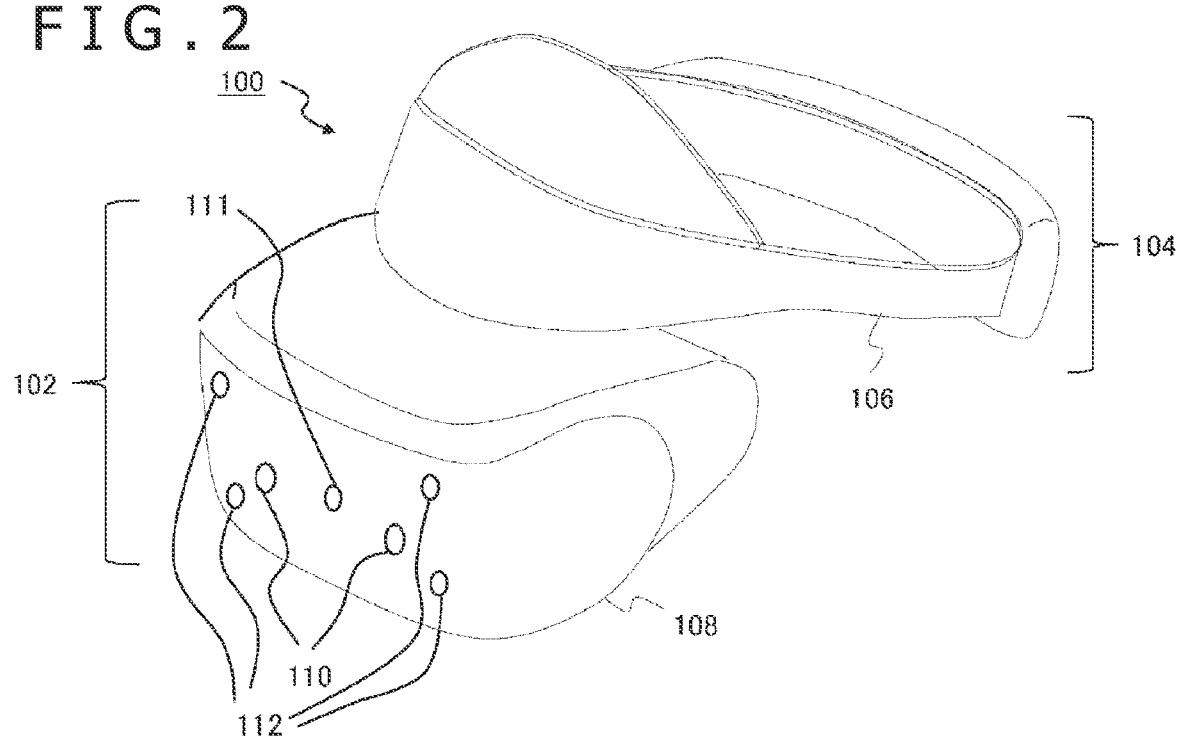
FIG. 2 is a diagram illustrating an example of appearance of a head mount display of the present embodiment.

FIG. 2 illustrates an example of appearance of the head mount display 100. In this example, the head mount display 100 includes an output mechanism section 102 and a mounting mechanism section 104. The mounting mechanism section 104 includes a mounting band 106 that is placed around the head for fixation when worn by the user. The output mechanism section 102 includes an enclosure 108 in a shape to cover right and left eyes when the user wears the head mount display 100, inside of which a display panel is installed such that it is to directly face the eyes.

The enclosure 108 further includes an eyepiece, through an image is seen in an enlarged scale, installed inside at a position between the display panel and the eyes of the user when the head mount display 100 is worn. In addition, the head mount display 100 may further include a speaker or an earphone at a position corresponding to an ear of the user when the head mount display 100 is worn.

The head mount display 100 further includes a stereo camera 110 in a front surface of the enclosure 108, a monocular camera 111 with a wide perspective at a middle, and four cameras 112 with a wide perspective at four upper left, upper right, lower left, and lower right corners to capture a video of a real space in a direction corresponding to an orientation of the face of the user. In some aspects, the head mount display 100 causes a moving image captured by the stereo camera 110 to be immediately displayed, thereby providing a see-through mode to directly indicate the state of a real space in a user-facing direction.

In addition, at least one of images captured by the stereo camera 110, the monocular camera 111, and the four cameras 112 may be used to generate an image to be displayed. For example, the position or the attitude of the head mount display 100, and consequently, the position or the attitude of the head of the user relative to a surrounding space is acquired at a predetermined rate by SLAM (Simultaneous Localization and Mapping) to determine the field of vision of an image to be generated by the server 400 or cause the image processing apparatus 200 to correct the image. Alternatively, the image processing apparatus 200 may combine a captured image with an image sent from the server 400 to provide an image to be displayed.

In addition, the head mount display 100 may include any one of motion sensors for deriving the position, the attitude, the motion of the head mount display 100, such as an acceleration sensor, a gyroscope sensor, and a geomagnetic sensor, installed inside. In this case, the image processing apparatus 200 acquires information regarding the position or the attitude of the head of the user at a predetermined rate on the basis of a measurement value from the motion sensor. This information is usable to determine the field of vision of an image to be generated in the server 400 or correct the image in the image processing apparatus 200.

Figure 3:
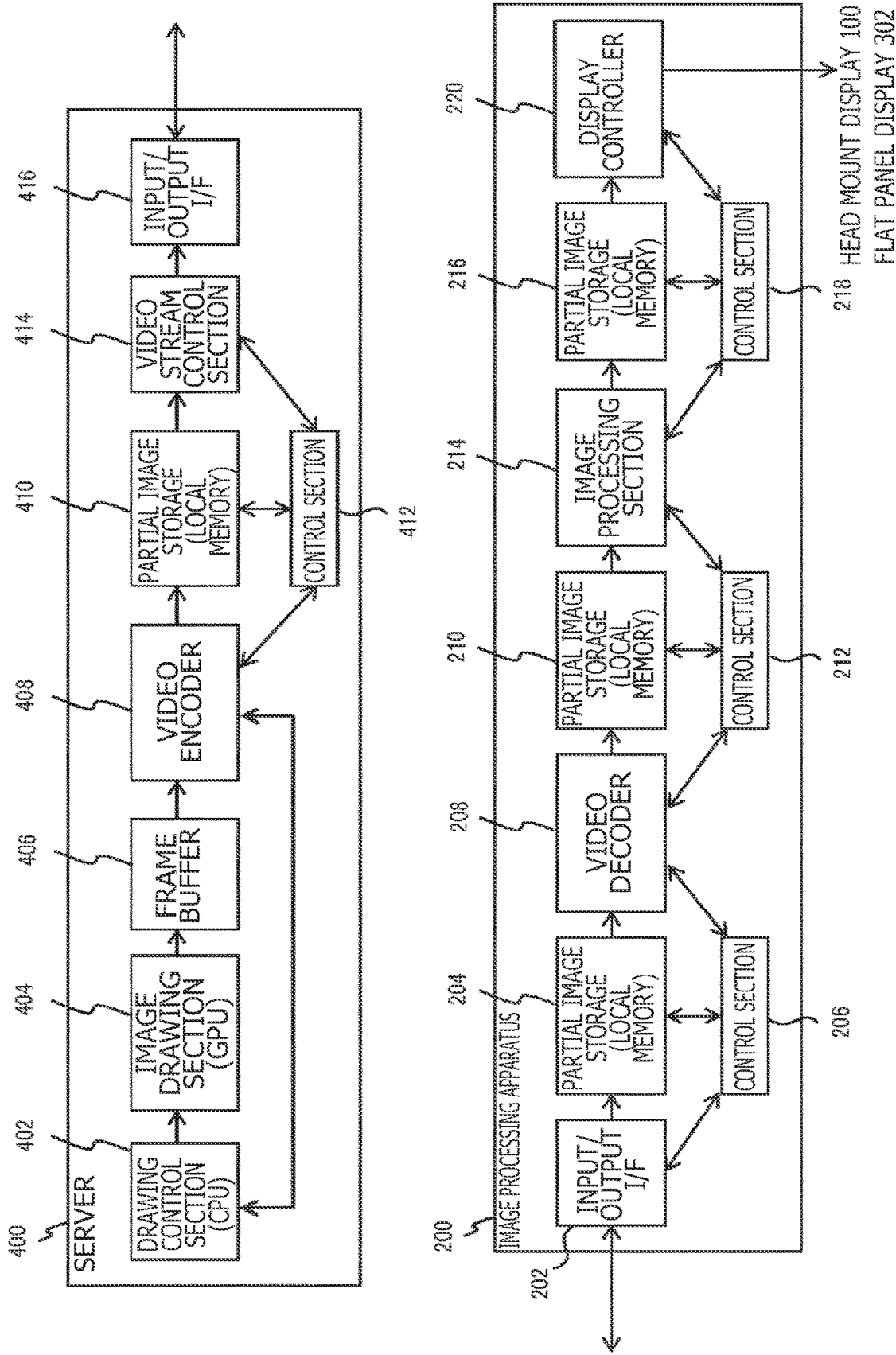
FIG. 3 is a diagram illustrating basic configurations of a server and an image processing apparatus according to the present embodiment.

FIG. 3 illustrates basic configurations of the server 400 and the image processing apparatus 200 according to the present embodiment. The server 400 and the image processing apparatus 200 according to the present embodiment include a local memory that stores a partial image smaller than one frame of an image to be displayed at a relevant part. Then, compression/encoding and sending of image data in the server 400 and reception, decoding/decompression, various image processes, and output of data to the display device in the image processing apparatus 200 are pipeline-processed in units of partial images. This reduces a delay time from drawing of an image in the server 400 to displaying on the display device connected to the image processing apparatus 200.

In the server 400, a drawing control section 402, which is implemented by a CPU (Central Processing Unit), controls drawing of an image by an image drawing section 404. As described above, the content of an image to be displayed according to the present embodiment is not limited and the drawing control section 402, for example, causes a cloud gaming to progress and causes the image drawing section 404 to draw a frame of a moving image depicting the result of the progress. At this time, the drawing control section 402 may acquire information regarding the position or the attitude of the head of the user from the image processing apparatus 200 and performs a control to draw each frame in a field of vision corresponding to the information.

The image drawing section 404, which is implemented by a GPU (Graphics Processing Unit), draws a frame of a moving image at a predetermined or variable rate under the control of the drawing control section 402 and causes a frame buffer 406 to store the result of the drawing. The frame buffer 406 is implemented by a RAM (Random Access Memory). A video encoder 408 performs compression/encoding of data regarding the image stored in the frame buffer 406 in units of partial images each smaller than one frame under the control of the drawing control section 402. The partial images refer to images of regions defined by dividing a plane of an image of a frame into predetermined sizes along a boundary set in a lateral direction, a longitudinal direction, lateral and longitudinal directions, or an oblique direction.

At this time, upon completion of drawing for one frame by the image drawing section 404, the video encoder 408 may start compression/encoding of the frame without waiting for a vertical synchronizing signal of the server. According to a conventional technology where various processes such as drawing and compression/encoding of a frame are synchronized with reference to a vertical synchronizing signal, durations of time given for processes from drawing to displaying of an image are equalized in units of frames, which facilitates management of a frame order. However, in this case, even though the drawing process is completed early depending on the content of a frame, it is necessary to stand by for the compression/encoding process until the next vertical synchronizing signal. According to the present embodiment, a generation time point of an image is managed in units of partial images to prevent an unnecessary standby time from being necessitated as described later.

An encoding scheme used by the video encoder 408 to perform compression/encoding may be a typical scheme such as H.264/AVC or H.265/HEVC. The video encoder 408 causes a partial image storage 410 to store compressed/encoded data regarding a partial-image-based image. The partial image storage 410, which also serves as a local memory implemented by a SRAM (Static Random Access Memory) or the like, has a storage region corresponding to a data size of a partial image smaller than one frame. The same applies to a "partial image storage" described hereinafter. Every time when compressed and encoded data regarding a partial image is stored in the partial image storage 410, a video stream control section 414 reads the data and packetize the data with, if necessary, audio data, control information, or the like contained therein.

The control section 412 constantly monitors the status of writing of data in the partial image storage 410 by the video encoder 408 and the status of reading of data by the video stream control section 414 and appropriately controls operations of both. For example, the control section 412 performs a control such that the partial image storage 410 suffers from neither deficiency of data, i.e., buffer underline, nor excess of data, i.e., buffer overrun.

An input/output interface 416 establishes communication with the image processing apparatus 200, sequentially sending the data packetized by the video stream control section 414 over the network 306. The input/output interface 416 may also send audio data in addition to image data, if necessary. In addition, the input/output interface 416 may further acquire a user operation or information regarding the position or the attitude of the head of the user from the image processing apparatus 200 and supply it to the drawing control section 402 as described above.

In the image processing apparatus 200, an input/output interface 202 sequentially acquires an image and audio data sent from the server 400. The input/output interface 202 may further acquire a user operation or information regarding the position or the attitude of the head of the user from the head mount display 100 or an input device (not illustrated), if necessary, and send it to the server 400. The input/output interface 202 decodes a packet acquired from the server 400 and then causes a partial image storage 204 to store taken data regarding the image.

The partial image storage 204, which is a local memory disposed between the input/output interface 202 and a video decoder 208, serves as a compressed data storage. A control section 206 constantly monitors the status of writing of data in the partial image storage 204 by the input/output interface 202 and the status of reading of data by the video decoder 208 and appropriately controls operations of both.

Every time when data regarding a partial image is stored in the partial image storage 204, the video decoder 208 reads the data as a decoding/decompression section and causes a partial image storage 210 to store the data after decoding and decompressing the data through a procedure according to the encoding scheme. The partial image storage 210, which is a local memory disposed between the video decoder 208 and an image processing section 214, serves as a decompressed data storage. A control section 212 constantly monitors the status of writing of data in the partial image storage 210 by the video decoder 208 and the status of reading of data by the image processing section 214 and appropriately controls operations of both.

Every time when decoded and decompressed data regarding a partial image is stored in the partial image storage 210, the image processing section 214 reads the data and applies a process necessary for displaying. For example, to allow an image without distortion to be seen through the eyepiece of the head mount display 100, the image processing section 214 performs a correction process to give a distortion inverse to a distortion of the eyepiece. Alternatively, the image processing section 214 may make reference to a separately prepared UI plain image and combine (superimpose) it with an image sent from the server 400.

The image processing section 214 may also combine an image captured by the camera of the head mount display 100 with an image sent from the server 400. The image processing section 214 may also correct an image sent from the server 400 such that a field of vision corresponds to the position or the attitude of the head of the user at the time of processing. The image processing section 214 may also perform an image process suitable for output to the flat panel display 302, such as a super-resolution process.

In any case, the image processing section 214 applies a process in units of partial images stored in the partial image storage 210 and causes a partial image storage 216 to sequentially store the partial images. The partial image storage 216 is a local memory disposed between the image processing section 214 and a display controller 220. A control section 218 constantly monitors the status of writing of data in the partial image storage 216 by the image processing section 214 and the status of reading of data by the display controller 220 and appropriately controls operations of both.

Every time when data regarding an image-processed partial image is stored in the partial image storage 216, the display controller 220 reads the data and outputs the data to the head mount display 100 or the flat panel display 302 at an appropriate timing. Specifically, data regarding a partial image in the uppermost tier in each frame is outputted at timings matching vertical synchronizing signals of these displays and then data regarding partial images therebelow is sequentially outputted.

Figure 4:
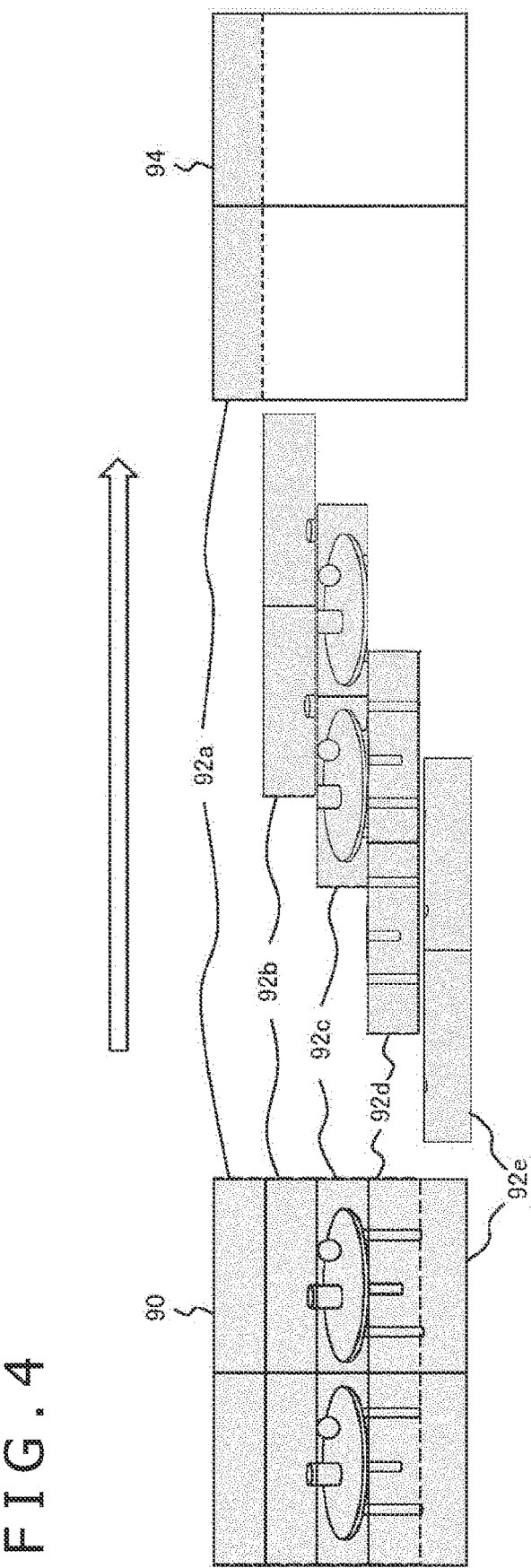

Next, description will be made on the pipeline process of a partial image to be performed by the server 400 and the image processing apparatus 200 during a period from drawing to displaying of an image. FIG. 4 schematically illustrates what processes from drawing to displaying of an image according to the present embodiment are like. The server 400 generates a frame 90 of a moving image at a predetermined or variable rate as described above. In the illustrated example, the frame 90 has a configuration where images for right eye and left eye are displayed in halved right and left regions, respectively. However, it does not mean that the configuration of an image generated by the server 400 is limited thereto.

The server 400 compresses and encodes the frame 90 on a partial-image-by-partial-image basis as described above. In the figure, an image plane is divided in a horizontal direction into five to provide partial images 92a, 92b, 92c, 92d, and 92e. The partial images are thus compressed and encoded one after another in this order, being transmitted to the image processing apparatus 200 to be displayed as indicated by an arrow. In other words, while the partial image 92a in the uppermost tier is subjected to processes including compression/encoding, sending, decoding/decompression, and output to the display panel 94, the partial image 92b immediately below, the partial image 92c further below, and the like are sequentially transmitted and displayed. This makes it possible to perform various processes necessary for drawing to displaying of an image in parallel and to cause the display to progress with a minimum delay even though a transfer time intervenes.

Figure 5:
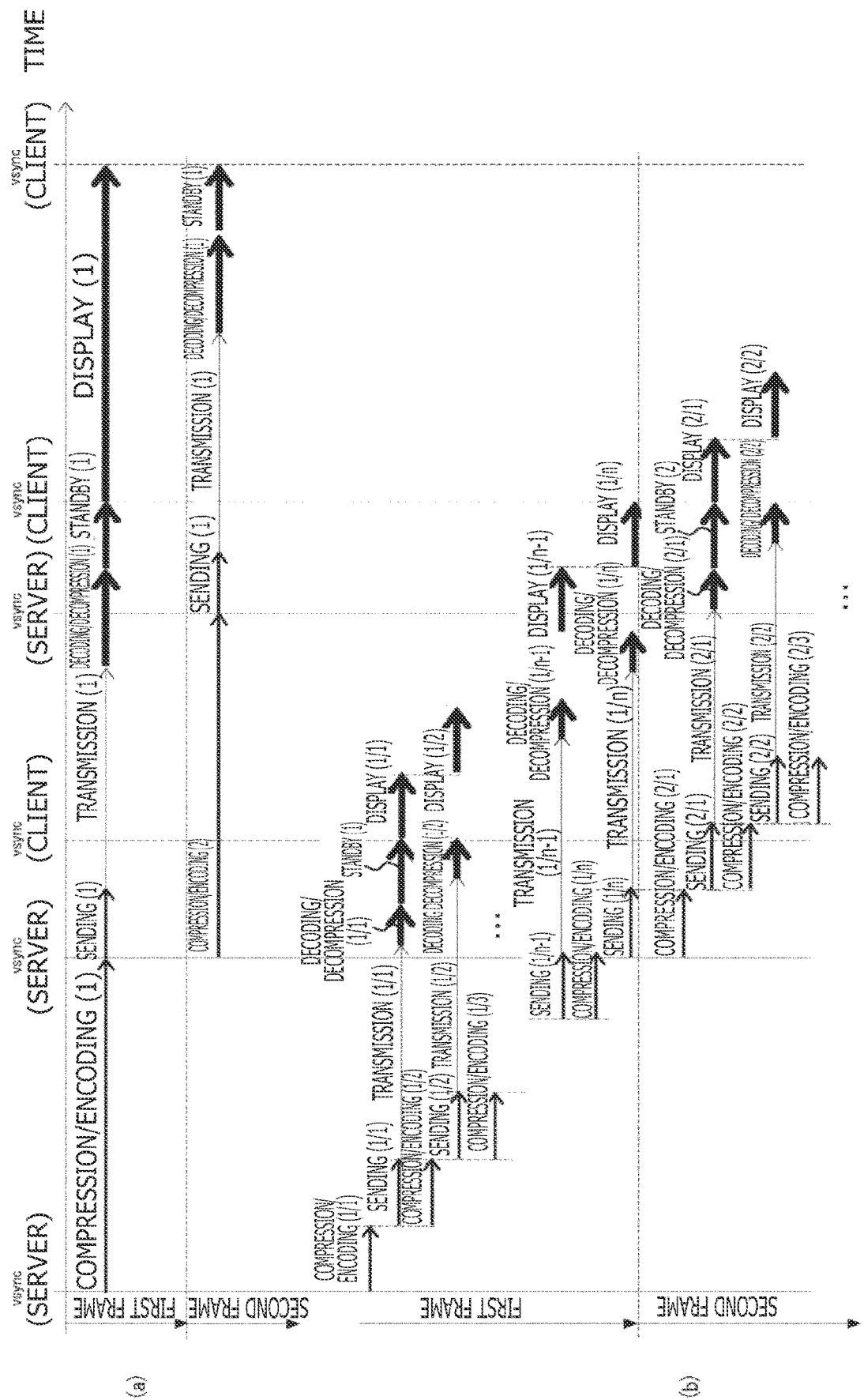
FIG. 5 is a diagram of assistance in explaining an effect of the server and the image processing apparatus performing a pipeline process in units of partial images according to the present embodiment.

FIG. 5 is a diagram of assistance in explaining an effect of the server 400 and the image processing apparatus 200 performing the pipeline process in units of partial images according to the present embodiment. A lateral direction in the figure represents time elapsed and processing times are indicated by arrows with the names of processes. Ones of the processes on a server 400 side are indicated by narrow lines and ones of the processes on an image processing apparatus 200 side are indicated by bold lines. Regarding letters in parenthesis written with the names of processes, (m) denotes a process for one frame of a frame number m and (m/n) denotes a process of the n-th partial image in the frame number m.

In addition, vsync (server) denotes a vertical synchronizing signal on the server 400 side and vsync (client) denotes a vertical synchronizing signal on a side including the image processing apparatus 200 and the display device. First, (a) illustrates a conventional aspect where a process is caused to progress on a frame-by-frame basis for the purpose of comparison. In this example, the server 400 controls a process for each frame according to the vertical synchronizing signal. The server 400 thus starts compression/encoding of data regarding the first one of frames stored in the frame buffer in response to the vertical synchronizing signal.

Then, while starting compression/encoding of data regarding the second one of the frames in response to the next vertical synchronizing signal, the server 400 packetizes the compressed and encoded data regarding the first frame in a predetermined unit and sends it. The image processing apparatus 200 applies a decoding/decompression process to the frames on a first-come basis. However, even though decoding/decompression is completed and a state ready for displaying is reached, the displaying is kept on standby until a timing of the next coming vertical synchronizing signal. As a result, in the illustrated example, a delay corresponding to a display period for two frames or more occurs before the start of the displaying after the start of the compression/encoding process subsequent to the completion of the drawing of one frame in the server 400.

A delay more than the above may occur depending on time of communication between the server 400, the image processing apparatus 200, or the like, a difference in timing between vertical synchronizing signals of them. According to the present embodiment illustrated in (b), at the instant of completion of compression/encoding of the first one of the partial images of the first frame, the server 400 starts sending data regarding the partial image. During transmission of the data through the network 306, the server 400 performs compression/encoding and transmission of the second one of the partial images, compression/encoding and transmission of the third one of the partial images, . . . , thus causing a transmission process to progress in units of partial images.

The acquired data regarding the partial images is decoded and decompressed in sequence on the image processing apparatus 200 side. As a result, the data regarding the first partial image reaches a state ready for displaying significantly earlier than in a case of (a). It should be noted that displaying of the data regarding the first partial image is kept on standby until the timing of the next coming vertical synchronizing signal. The subsequent partial images are sequentially outputted following the output of the first partial image. Since the display time itself per frame is similar to that of (a), displaying of the n-th partial image will have been completed by the coming of the next vertical synchronizing signal.

By virtue of causing compression/encoding to displaying of image data to progress in parallel in units finer than one frame as described above, displaying can be performed at a timing earlier by an amount corresponding to one frame than in the case of (a) in the illustrated example. It should be noted that although compression/encoding by the server 400 is likewise started in response to the vertical synchronizing signal in a case of (b) in the illustrated example, a delay time can be further reduced by performing compression/encoding without waiting for the vertical synchronizing signal as described above.

Here, in either aspect of (a) or (b), in order to stably repeat the processing flow as illustrated, it is necessary that all the continuous frames are in a state ready for displaying with a constant period corresponding to the frame rate of the moving image. However, time required for compression/encoding by the server 400, data transmission over the network, and decoding/decompression and various image processes by the image processing apparatus 200 has a fluctuation (jitter). In addition, a clock that controls the timings of the processes also contains a jitter originating with a clock oscillation circuit.

If time required for transmission is increased or the vertical synchronizing signal is provided earlier due to a jitter, accumulation of variations thereof, each of which may be slight, would result in failure of data regarding a frame to be prepared at or before an output timing. This may lead to occurrence of "drop frame," that is, the frame failing to be displayed, or occurrence of a delay in displaying.

Accordingly, the image processing apparatus 200 of the present embodiment performs at least part of the processes being performed therein at a rate higher than a rate of generation of frames by the server 400, i.e., an intended frame rate of a moving image. Here, "rate" means the number of frames that can be processed per unit of time and the process is not necessarily performed in all the processing cycles. In addition, even though the rate of the process is increased, a frequency at which the frames of the moving image are updated is basically determined by the rate of generation of frames by the server 400. Hereinafter, the latter is referred to as "frame rate of a moving image," being distinguished from the rate of the process by the image processing apparatus 200. It should be noted that on the whole, a unit of data to be processed at the "rate" is not limited to a frame and may be a partial image.

Figure 6:
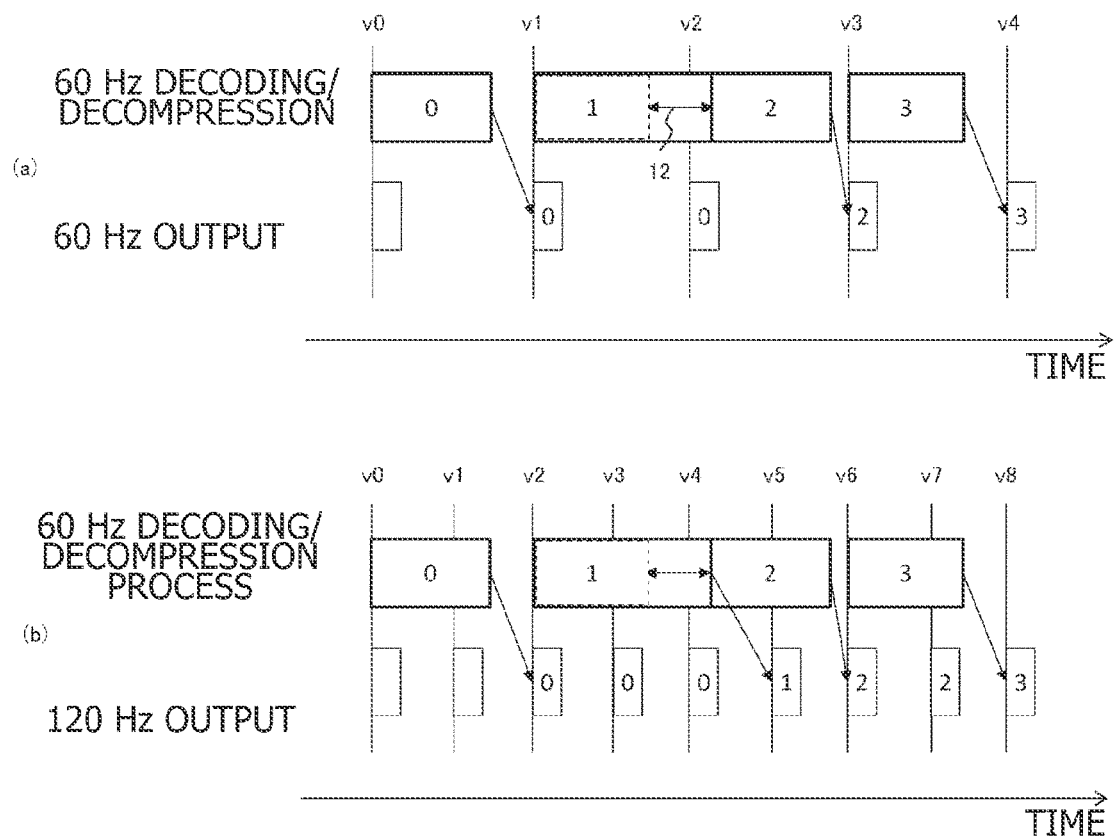
FIG. 6 is a diagram of assistance in explaining an effect of setting a processing rate of the image processing apparatus higher than a frame rate of a moving image according to the present embodiment.

FIG. 6 is a diagram of assistance in explaining an effect of setting the processing rate of the image processing apparatus 200 higher than the frame rate of the moving image. In this example, it is assumed that the frame rate of the moving image is 60 Hz (60 fps). (a) and (b) in the figure each illustrate, with respect to time elapsed represented by a lateral axis, time when the image processing apparatus 200 performs the decoding/decompression process (upper tier) and the process of output to the display panel (lower tier). A rectangle represents processing time for each frame and the number of a frame to be processed is written in the rectangle.

It should be noted that this figure and FIGS. 9 and 10 hereinbelow illustrate an aspect where the decoding/decompression process and output to the display panel is to be performed in units of frames as (a) of FIG. 5 for the purpose of facilitating understanding. In a case where the process is caused to progress in units of partial image, the decoding/decompression process and the process of output to the display panel for the same frame are to be performed in parallel as in (b) of FIG. 5. However, a principle for implementing the present embodiment and an effect thereof are similar. In other words, the present embodiment described hereinafter is applicable irrespective of whether a unit for the processes in the image processing apparatus 200 is a frame or a partial image smaller than the frame.

(a) illustrates a case where both the decoding/decompression process and the process of output to the display panel, which are to be performed by the image processing apparatus 200, are to be performed at the frame rate of the moving image, or 60 Hz. v0, v1, v2, . . . represented by longitudinal lines in the figure denote vertical synchronizing signals at 60 Hz. As described with reference to FIG. 5, the image processing apparatus 200 waits for the next vertical synchronizing signal to come and outputs, in response to the vertical synchronizing signal, data regarding a frame having been subjected to the decoding/decompression process to be ready for displaying. For example, in (a) of FIG. 6, output of data regarding a "0"th frame to the display panel is started at a timing of the vertical synchronizing signal "v1" coming immediately after the completion of decoding/decompression. The same applies to a "2"nd frame and a "3"rd frame.

However, jitter exists during the decoding/decompression process as described above, which causes, for example, time required for the decoding/decompression process for a "1"st frame to fluctuate as indicated by an arrow 12. As a result, in a case where the processing time changes in an increasing direction, the output to the display panel may fail to be started at the intended timing "v2." Consequently, the data regarding the "0"th frame, which has been displayed until now, is outputted and displayed again on the display panel.

In addition, in this example, the decoding/decompression of data regarding the "2"nd frame is completed before the next vertical synchronizing signal "v3." Thus, an image of the "2"nd frame is to be displayed with displaying of the "1"st frame skipped. In other words, the "1"st frame is dropped in this example. Frame display time becomes longer or shorter depending on a deviation of time of the decoding/decompression process, which may cause a user to feel the motion of a target to be displayed strange. Such a phenomenon would be caused by a jitter not only during the decoding/decompression process but also during compression/encoding or data transmission in the server 400, or various processes in the image processing apparatus 200 or a jitter of a vertical synchronizing signal itself as described above.

(b) illustrates a case where the process of output to the display panel is to be performed at 120 Hz with the decoding/decompression process, which is to be performed by the image processing apparatus 200, kept at 60 Hz. In other words, vertical synchronizing signals twice as many as in the case of (a) are caused to occur as indicated by longitudinal lines in the figure. This increases opportunities to perform output to the display panel, which makes it possible to reduce an influence of a fluctuation in timing when an image gets ready for displaying due to the above-described various factors. In the illustrated example, even though time required for the decoding/decompression process for the "1"st frame increases as in (a), that frame can be outputted to the display at a timing of a vertical synchronizing signal "v5" coming immediately after.

By virtue of additionally making output opportunities of output, the possibility of drop frame is lowered. In addition, a possible maximum time spent from when the state where a frame gets ready for displaying is reached to when a vertical synchronizing signal occurs can be shortened. This makes it possible to improve responsiveness with a delay time before displaying reduced even in an aspect where, for example, an image is caused to change in accordance with a user operation. It should be noted that although data regarding a frame is outputted when the decoding/decompression process is completed in the illustrated example, an effect is similar even though a predetermined process is further applied to the data as described above.

In addition, although the rate of output to the display panel is raised by increasing the frequency of the vertical synchronizing signals in the case of the figure, a process to be performed at a rate higher than the frame rate of the moving image is not limited to output to the display panel as described later. In addition, although the frame rate of the moving image is 60 Hz and the rate of output to the display panel is 120 Hz in the illustrated example, a similar effect can be achieved at least as long as the latter is set larger than the former. However, by virtue of setting the rate of the process N times (N is an integer of two or more) as high as the frame rate of the moving image, control of the process is facilitated and display time of each frame is equalized to make the motion of a target to be displayed likely to look natural.

Figure 7:
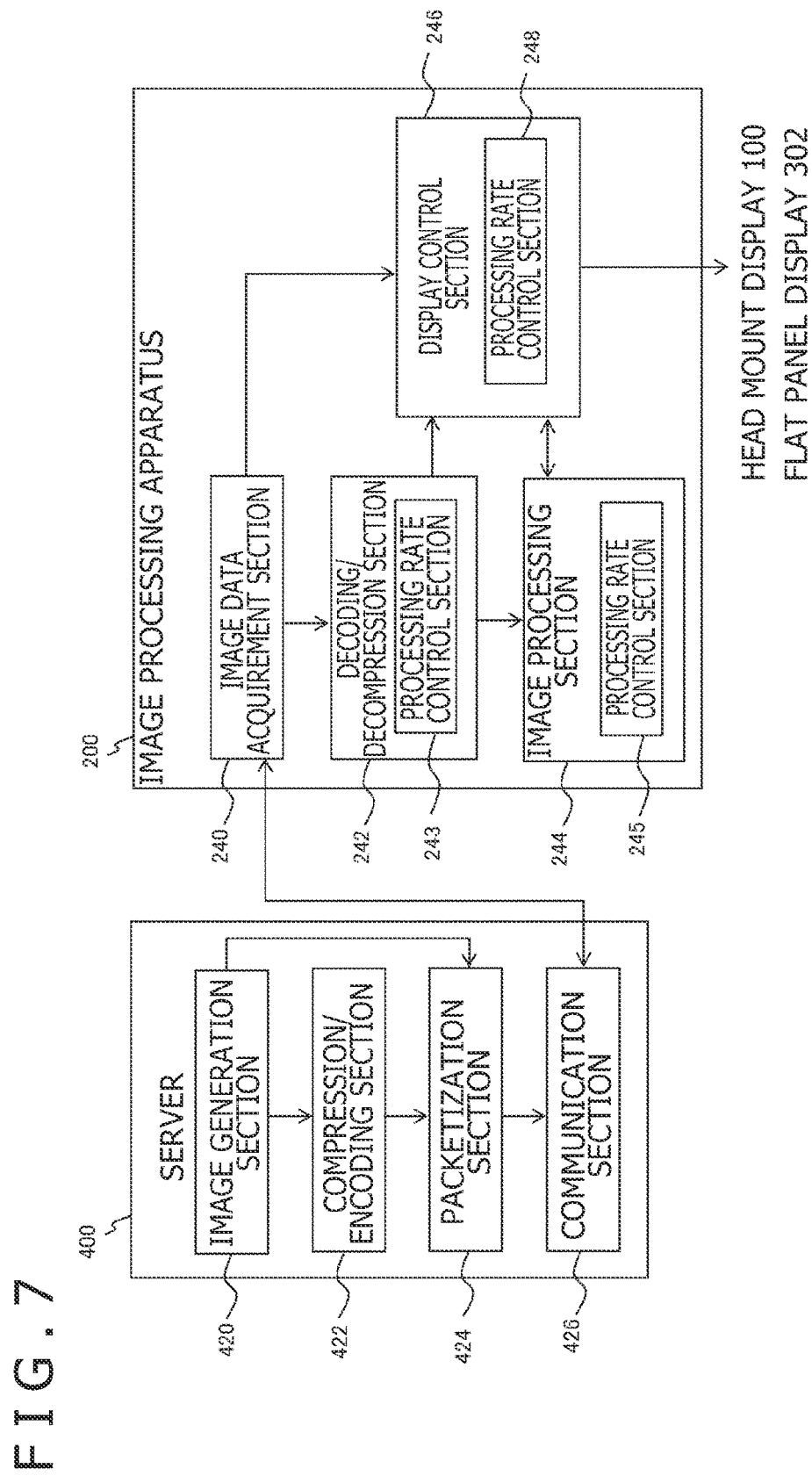
FIG. 7 is a diagram illustrating configurations of functional blocks of the server and the image processing apparatus according to the present embodiment.

FIG. 7 illustrates configurations of functional blocks of the server 400 and image processing apparatus 200 of the present embodiment. The functional blocks illustrated in the figure can each be implemented by, in terms of hardware, a CPU, a GPU, an encoder, a decoder, a computing element, various memories, etc., while being implemented by, in terms of software, a program loaded from a recording medium into the memory and that exhibits functions such as an information processing function, an image drawing function, a data input/output function, and a communication function. Accordingly, it is understandable by those skilled in the art that these functional blocks can be implemented in a variety of forms by hardware only, software only, or a combination thereof and are by no means limited to any of the above.

The server 400 includes an image generation section 420, a compression/encoding section 422, a packetization section 424, and a communication section 426. The image generation section 420, which includes the drawing control section 402, the image drawing section 404, and the frame buffer 406 in FIG. 3, generates a frame of a moving image, such as a game image, to be sent to the image processing apparatus 200 at a predetermined or variable rate. Alternatively, the image generation section 420 may acquire data regarding a moving data from a camera, a storage device, or the like (not illustrated). In this case, the image generation section 420 can be read as an image acquisition section. The same applies to a description hereinafter.

The compression/encoding section 422, which includes the video encoder 408, the partial image storage 410, and the control section 412 in FIG. 3, compresses and encodes the data regarding the image generated by the image generation section 420 in units of partial images. Here, the compression/encoding section 422 performs motion compensation and encoding in units of regions of a predetermined number of lines such as one line or two lines or rectangular regions with a predetermined size such as 16×16 pixels or 64×64 pixels. The compression/encoding section 422 may thus start compression/encoding when data regarding a minimum-unit region necessary for compression/encoding is generated by the image generation section 420.

It should be noted that a partial image, or unit for the pipeline process for compression/encoding and sending, may be the same as the minimum-unit region or a region larger than it. The packetization section 424, which includes the video stream control section 414 and the control section 412 in FIG. 3, packetizes the compressed and encoded data regarding a partial image in a form according to a protocol for communication in use. At this time, a time point when the partial image is drawn (hereinbelow, referred to as "generation time point") is acquired from the image generation section 420 or the compression/encoding section 422, thereby being associated with the data regarding the partial image.

The communication section 426, which includes the input/output interface 416 in FIG. 3, sends a packet containing the compressed and encoded data regarding the partial image and the generation time point thereof to the image processing apparatus 200. By virtue of these configurations, the server 400 performs compression/encoding, packetization, and sending in parallel through the pipeline process in units of partial images each smaller than one frame. The image processing apparatus 200 includes an image data acquirement section 240, a decoding/decompression section 242, an image processing section 244, and a display control section 246.

It should be noted that the decoding/decompression section 242 and the image processing section 244 have a common function in the sense that they apply a predetermined process to data regarding the partial image to generate data regarding the partial image for displaying and at least one of them can be comprehensively referred to as "image processing section." The image data acquirement section 240, which includes the input/output interface 202, the partial image storage 204, and the control section 206 in FIG. 3, acquires the compressed and encoded data regarding the partial image along with the generation time point thereof from the server 400.

The decoding/decompression section 242, which includes the video decoder 208, the partial image storage 210, and the control section 206, and the control section 212 in FIG. 3, decodes and decompresses the compressed and encoded data regarding the partial image. Here, the decoding/decompression section 242 may start the decoding/decompression process when data regarding a minimum-unit region necessary for compression/encoding, such as motion compensation and encoding, is acquired by the image data acquirement section 240.

The decoding/decompression section 242 may also include a processing rate control section 243. The processing rate control section 243 controls the decoding/decompression section 242 such that the rate of the decoding/decompression process becomes higher than the frame rate of the moving image. This causes the decoding/decompression section 242 to repeat a cycle of the decoding/decompression process for each frame at the rate higher than the frame rate of the moving image. For the frame rate of the moving image, a frame rate acquired as metadata regarding the moving image by the image data acquirement section 240 is referred to. The processing rate control section 243 determines the rate of the decoding/decompression process on the basis of the frame rate. In a case where the frame rate of the moving image is variable, the processing rate control section 243 may change the rate of the decoding/decompression process, accordingly.

It should be noted that the "rate" of the decoding/decompression process corresponds to an "opportunity" to perform decoding/decompression of one frame like the above-described rate of output to the display panel. In other words, when the decoding/decompression section 242 raises the rate of the decoding/decompression process, it means that time required for the decoding/decompression process for each frame is shortened so that the start of the decoding/decompression process for the next frame can be allowed in a short time. Since the frame rate of the moving image to be processed is determined on the server 400 side, a cycle with data regarding a frame to be decoded and decompressed not acquired would occur depending on timing. In this case, the decoding/decompression section 242 temporarily stops the decoding/decompression process for that cycle.

For example, the processing rate control section 243 determines, on the basis of the data amount of a frame to be processed acquired per unit of time, a computing power necessary for processing data regarding the frame without delay and enabling temporarily stopping the process by shortening the processing time. The decoding/decompression section 242 is then controlled to perform the decoding/decompression process in a mode corresponding to the determined computing power. For example, in a case where the decoding/decompression section 242 includes a processor, a motion vector entropy calculator, and a pixel denoising filter (not illustrated), the mode of the computing power is switched by changing the motion clock frequency of each block or changing the number of hard-wired blocks that operate in parallel. The processing rate control section 243 switches, by way of example, the processing power of the processor between 10 GFLOPS and 20 GFLOPS, the processing power of the motion vector entropy calculator between 100 Mop/s and 200 Mop/s, and the processing power of the pixel denoising filter between 1000 MPixel/s and 2000 MPixel/s.

The image processing section 244, which includes the image processing section 214, the partial image storage 216, the control section 212, and the control section 218 in FIG. 3, applies a predetermined process to data regarding the partial image to generate data regarding the partial image for displaying. For example, the image processing section 244 applies correction that gives an inverse distortion in consideration of the distortion of the eyepiece of the head mount display 100 as described above.

Alternatively, the image processing section 244 combines an image supposed to be displayed with the moving image, such as a UI plain image, in units of partial images. The image processing section 244 also acquires the position or the attitude of the head of the user at that point of time and corrects the image generated by the server 400 to precisely match the field of vision for displaying. This makes it possible to minimize a time lag occurring between the motion of the head of the user and the displayed image due to time of transfer from the server 400.

In addition to the above, the image processing section 244 may perform one of typical image processes or a combination thereof. For example, the image processing section 244 may perform gamma curve correction, tone curve correction, contrast enhancement, or the like. In other words, the pixel value and luminance value of the decoded and decompressed image data may be subjected to a necessary offset correction on the basis of the characteristics of the display device or user designation. The image processing section 244 may also perform a denoising process including processes such as superimposition, weighted average, and smoothening with reference to a nearby pixel.

The image processing section 244 may also cause the resolution of the image data to match the resolution of the display panel or perform weighted average/oversampling such as bilinear/trilinear or the like with reference to a nearby pixel. The image processing section 244 may also determine the type of an image texture with reference to a nearby pixel and selectively perform processes for denoising, edge enhancement, smoothing, and tone/gamma/contrast correction, accordingly. At this time, the image processing section 244 may perform the process in combination with upscaler/downscaler for image size.

The image processing section 244 may perform format conversion in a case where the pixel format of the image data and the pixel format of the display panel are different from each other. For example, the image processing section 244 may perform conversion from YUV to RGB, from RGB to YUV, or between 444, 422, and 420 in YUV, conversion between 8-, 10-, and 12-bit colors in RGB, or the like. In addition, in a case where the decoded image data is in a format compatible with an HDR (High Dynamic Range) luminance range, whereas the display has a narrowed range compatible with the HDR luminance range (for example, a luminance dynamic range that can be displayed is narrower than that according to HDR format standards), the image processing section 244 may perform a pseudo HDR process (color space change) that enables conversion to an HDR luminance range format that provides a range with which the display panel is compatible while the features of an HDR image is caused to remain as much as possible.

In addition, in a case where the decoded image data is in an HDR-compatible format, whereas the display is compatible with only an SDR (Standard Dynamic Range), the image processing section 244 may perform color space conversion to the SDR format while the features of the HDR image is caused to remain as much as possible. In a case where the decoded image data is in an SDR-compatible format, whereas the display is compatible with an HDR, the image processing section 244 may perform enhancement conversion to an HDR format suitably to the characteristics of the HDR panel as much as possible.

In addition, in a case where the gradation expression power of the display is low, the image processing section 244 may perform error diffusion addition or may perform a dithering process in combination with pixel format conversion. In addition, in a case where the decoded image data is partially defective or abnormal due to missing or bit error of network transfer data, the image processing section 244 may apply a correction process to the relevant region. In addition, the image processing section 244 may perform filling with a single color, correction by replication of a nearby pixel, correction according to an antecedent frame nearby pixel, or correction according to a pixel presumed from the surroundings of the previous frame or the current frame by adaptive defect correction.

In addition, in order to reduce the necessary band of the interface to be outputted from the image processing apparatus 200 to the display device, the image processing section 244 may perform image compression. At this time, the image processing section 244 may perform right-weighted entropy coding by reference to a nearby pixel, index-value reference coding, Huffman coding, or the like. Meanwhile, in a case where the display device includes a liquid crystal panel, a high resolution can be achieved, whereas a rection speed is low. In a case where the display device includes an organic EL panel, the reaction speed is high, whereas it is difficult to achieve a high resolution and a phenomenon referred to as Black Smearing, that is, color bleeding in a black-colored region and the surroundings thereof, would occur.

Accordingly, the image processing section 244 may perform correction to eliminate such various adverse influences of the display panel. For example, for a liquid crystal panel, the image processing section 244 may reset a crystal by inserting a black image between frames to improve the reaction speed. In contrast, for an organic EL panel, the image processing section 244 offsets a luminance value or a gamma value for gamma correction to make color bleeding of Black Smearing less noticeable.

The image processing section 244 may apply definition enhancement or a super resolution process (Super Resolution) to an image to restore or reconstruct a high-frequency component. At this time, the image processing section 244 may convert the image by inputting the image data to a database or a network model constructed in advance by machine leaning or deep leaning. Here, the image processing section 244 may perform conversion in units of partial images to achieve a reduction in delay. At this time, the units of partial images are caused to match units of partial images determined on the basis of an order of scanning or a divided configuration of the display panel, which makes it possible to perform a series of processes in a pipeline manner and to achieve a further reduction in delay.

The image processing section 244 may also include a processing rate control section 245. The processing rate control section 245 controls the image processing section 244 such that rates of the various processes to be performed exceed the frame rate of the moving image. For the frame rate of the moving image, a frame rate acquired as metadata regarding the moving image by the image data acquirement section 240 is referred to as described above. The processing rate control section 245 determines, on the basis of that frame rate, the rate of the processes to be performed by the image processing section 244.

In a case where the frame rate of the moving image is variable, the processing rate control section 245 may change the rate of the various processes according to the frame rate. It should be noted that the "rate" to be controlled by the processing rate control section 245 likewise means the same as the rate to be controlled by the processing rate control section 243 of the decoding/decompression section 242. Thus, during a processing cycle with data regarding a frame to be processed not acquired, the image processing section 244 temporarily stops the ongoing image process.

For example, the processing rate control section 245 determines, on the basis of the data amount of a frame to be processed acquired per unit of time, a computing power necessary for processing data regarding the frame without delay and enabling temporarily stopping the process by shortening the processing time. The image processing section 244 is then controlled to perform the decoding/decompression process in a mode corresponding to the determined computing power. The manner of control may be similar to that of the processing rate control section 243 described above.

The display control section 246, which includes the display controller 220 and the control section 218 in FIG. 3, causes data regarding partial images for displaying to be sequentially displayed on the display panel of the head mount display 100 or the flat panel display 302. However, in the present embodiment, compressed and encoded data regarding partial images is individually acquired from the server 400, so that the order of acquirement may be switched depending on a communication state or data regarding a partial image itself may fail to be acquired due to packet loss.

Accordingly, the display control section 246 derives time elapsed since when the partial images are drawn from the generation time points of the partial images and adjusts the timings of output of the partial images to the display panel such that the timings of drawing in the server 400 are reproduced. Specifically, the display control section 246 identifies, on the basis of the generation time points of the partial images and/or the time elapsed since the generation time points, the intended order of displaying or timings of displaying of the data regarding the partial images and a data acquirement state such as the amount of loss of the data regarding the partial images.

The display control section 246 then changes a target to be outputted to the display panel and appropriately adjusts the order of output or the timings of output according to the data acquirement state. For example, the display control section 246 determines whether intended data regarding a partial image contained in the next frame is to be outputted or data regarding a partial image contained in a frame antecedent thereto is to be outputted again according to the data acquirement state. The display control section 246 determines such a target to be outputted by a time point of the start of displaying the next frame, or timing of a vertical synchronizing signal.

For example, in a case where the partial images of a frame are missing at a percentage of a predetermined value or more, the display control section 246 may change a target to be outputted according to the amount (percentage) of the acquired partial images by, for example, replacing the target to be outputted with data regarding the antecedent frame. In addition, the display control section 246 may change a target to be outputted for a next frame displaying duration according to the past results of output of the previous frame or time elapsed after the generation time point. The display control section 246 outputs, in an order and at a timing thus determined, data regarding a partial image determined as the target to be outputted to the display panel.

The display control section 246 also includes a processing rate control section 248. The processing rate control section 248 makes reference to the frame rate of the moving image and provides more opportunities to output data regarding a frame ready for displaying than the frame rate of the moving image. For example, the processing rate control section 248 controls the display control section 246 to cause the rate of output of the frame data to the display panel to be higher than the frame rate of the moving image. As a result, the display control section 246 drives the display panel at a rate higher than the frame rate of the moving image.

This process corresponds to increasing the frequency of a vertical synchronizing signal as illustrated in FIG. 6. Thus, the display control section 246 outputs the data regarding the frame having been outputted again as described above unless data regarding a new frame is ready for displaying at the timing of output to the display panel, i.e., the timing of a vertical synchronizing signal. In an example in FIG. 6, at timings of vertical synchronizing signals "v2," "v3," and "v4," data regarding the same frame, or "0"th frame, is outputted and displayed. Accordingly, the display control section 246 may include a memory (not illustrated) that holds data regarding a previous frame until data regarding a new frame ready for displaying is acquired.

In addition, in the present embodiment, it is acceptable that the timing when data regarding a frame is caused to be ready for displaying by the decoding/decompression section 242 and the image processing section 244 is asynchronous with the timing of output to the display panel, i.e., the vertical synchronizing signal, and that time required for causing data regarding a frame to be ready for displaying is variable. Even in these cases, the display control section 246 outputs data regarding a frame ready for displaying to the display panel at the timing of output coming immediately after as illustrated in FIG. 6, thereby reducing delay in display and drop frame.

It should be noted that in a case where the frame rate of the moving image is variable, the processing rate control section 248 may change the frequency of the vertical synchronizing signals, accordingly. In addition, the processing rate control section 248 may change, in addition to the frequency of the vertical synchronizing signals, the timing of occurrence thereof slightly. For example, a slight clock error between the server 400 and the image processing apparatus 200 may cause, as a result of accumulation thereof, the display period determined by the vertical synchronizing signal may be deviated from the generation period of the frames of the moving image.

Accordingly, the processing rate control section 248 adjusts the timings of occurrence of the vertical synchronizing signals so that such a deviation can be reduced to a predetermined value or less. For example, in a case where the frequency of the vertical synchronizing signals is N times (N is an integer of two or more) as high as the frame rate of the moving image, the processing rate control section 248 adjusts the timings of occurrence of the vertical synchronizing signals such that an interval between the generation time points of frames sent from the server 400 matches time given by multiplying the period of the vertical synchronizing signals by N. In addition, the processing rate control section 248 may measure time elapsed from the time point when the data regarding the frame gets ready for displaying to the time point of occurrence of the vertical synchronizing signal coming immediately after and adjusts the timing of occurrence of the vertical synchronizing signal such that the measured time reaches a target value.

FIG. 8 is a diagram of assistance in explaining a processing time for each frame with the rate of the decoding/decompression process set higher than the frame rate of the moving image. In the figure, rectangles represent, with respect to time elapsed represented by a lateral axis, respective processing times (processing cycles) per frame spent by the decoding/decompression section 242 performing the decoding/decompression process at the same rate as the frame rate of the moving image, or 60 Hz (upper tier), and at a doubled rate, or 120 Hz (lower tier). The characters "ON" in the rectangles indicate time when the decoding process is performed and "OFF" indicate temporary stop time when the decoding process is not performed.

In a case where the frame rate of the moving image is 60 Hz, image data for one frame is basically to be sent from the server 400 with a 1/60 (sec) period. With the rate of the decoding/decompression process set at 60 Hz, the decoding/decompression section 242 of the image processing apparatus 200 operates such that the decoding/decompression process for one frame is to be completed in time of 1/60 (sec) as illustrated in the upper tier in the figure. It should be noted that actual processing time varies with a jitter as described above.

In contrast, in a case where the rate of the decoding/decompression process is 120 Hz, the decoding/decompression section 242 operates such that the decoding/decompression process for one frame is to be completed in time of 1/120 (sec) as illustrated in the lower tier in the figure. However, since the image data acquisition section 240 acquires data regarding the moving image at 60 Hz, no data to be decoded and decompressed is to be newly acquired in the latter half of the 1/60 (sec) period. At this time, the decoding/decompression section 242 does not need to again decode and decompress the frame having been decoded and decompressed in the former half of 1/60 (sec) and temporarily stops the process in the latter half of the cycle as illustrated.

Here, the decoding/decompression section 242 does not need to start the decoding/decompression process in synchronization with the vertical synchronizing signals. In other words, as long as target data to be decoded and decompressed arrives and decoding/decompression of data regarding the antecedent frame is completed, the decoding/decompression section 242 may start decoding/decompression of the target data. In the figure, "ON" and "OFF" alternately appear during an operation for the decoding/decompression process at 120 Hz with the assumption that data regarding a frame is to be constantly obtained with a period of 1/60 Hz. However, the timing of "ON" varies with the timing of acquirement of data or the processing time of the antecedent frame.

FIG. 9 is a diagram of assistance in explaining changes in display depending on various combinations of the rate of output to the display panel and the rate of the decoding/decompression process. The manner of illustration in the figure is similar to that in FIG. 6 and the frame rate of the moving image is assumed to be 60 Hz. (a) illustrates both cases where the decoding/decompression process is to be performed at the same rate of the moving image, or 60 Hz, as in FIG. 6, whereas the process of output to the display panel is to be performed at 60 Hz and 120 Hz.

However, in this example, an arrow 14 indicates a jitter caused when the decoding/decompression section 242 acquires compressed and encoded data regarding the "1"st frame. The jitter at the data acquirement timing also provides results similar to those illustrated in FIG. 6. In other words, in a case where output to the display panel is performed in response to the vertical synchronizing signal at the same rate as the frame rate of the moving image, or 60 Hz, as indicated by a longitudinal line in the figure, decoding/decompression of the "1"st frame fails to be completed at or before an intended display timing. Opportunities of output are increased by performing output to the display panel at 120 Hz and thus a frame is more likely to be outputted even though data regarding the frame is acquired with delay.

(b) illustrates a case where the decoding/decompression process is also performed at 120 Hz. In detail, opportunities of decoding/decompression of a new frame are increased by speeding up the decoding/decompression process as illustrated in FIG. 8. This makes it possible to constantly accelerate the timing of completion of decoding/decompression of each frame as compared with in a case of (a). In addition, even if image data is acquired with delay as one regarding the "1"st frame in the figure, output can be more likely to be performed on time with respect to the vertical synchronizing signal coming immediately after.

Further, it is possible to reduce occurrence of a situation where although compressed and encoded data regarding the next frame (in the figure, the "2"nd frame) is acquired, the data has to be kept on standby because the decoding/decompression process for the antecedent frame (in the figure, the "1"st frame) is not completed. It should be noted that the figure illustrates that the effects resulting from the rate of the decoding/decompression process by the decoding/decompression section 242 being increased. However, for the image process to be performed by the image processing section 244, similar effects can also be achieved by increasing the set rate.

Further, in the illustrated example, the frame rate of the moving image is 60 Hz and the rate of the decoding/decompression process is 120 Hz. However, similar effects can be achieved at least as long as the latter is set larger than the former. However, the control of the process is facilitated by setting the rate of the process N' times (N' is an integer of two or more) as high as the frame rate of the moving image. Here, the rate of the process and the rate of output to the display panel may be the same or each independently determined. In other words, the parameter N' may be the same as the above-described parameter N or different therefrom.

Figure 10:
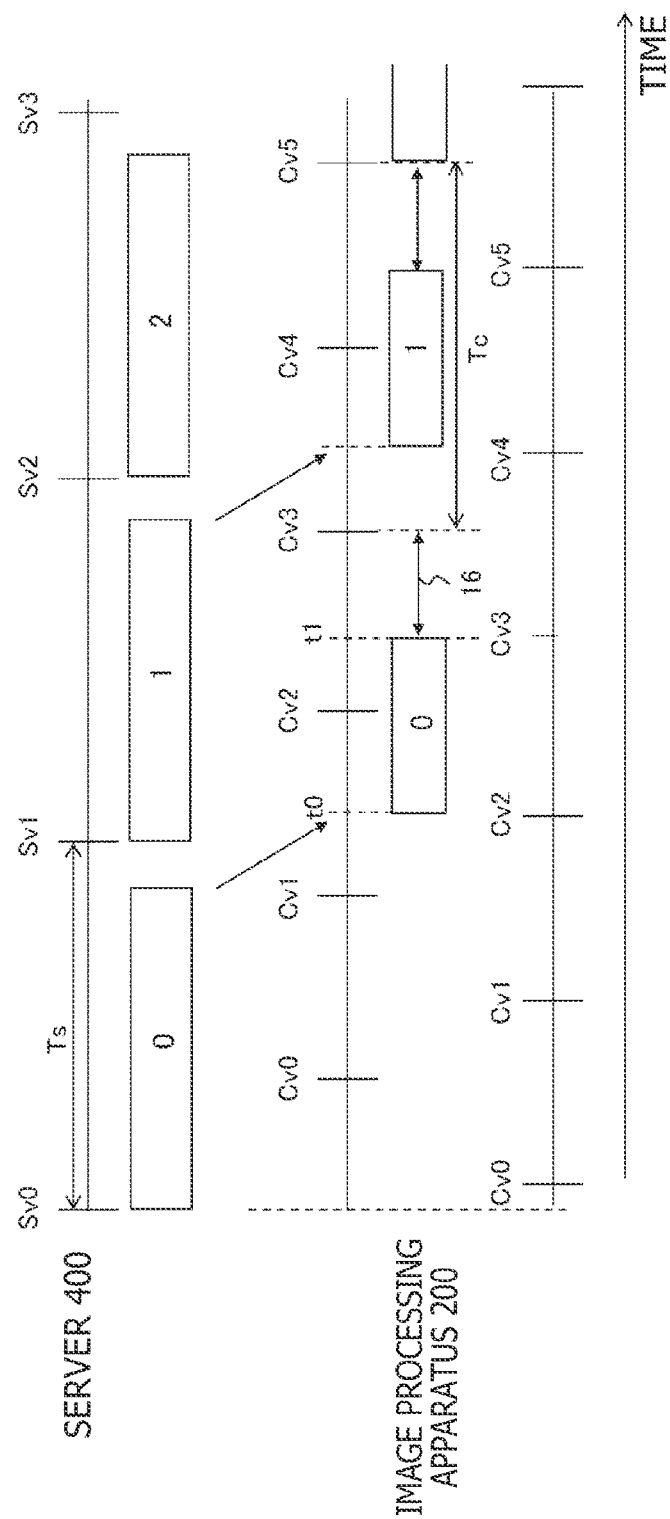
FIG. 10 is a diagram of assistance in explaining a principle for a processing rate control section of the image processing apparatus according to the present embodiment to adjust a timing of occurrence of a vertical synchronizing signal.

FIG. 10 is a diagram of assistance in explaining a principle for the processing rate control section 248 of the image processing apparatus 200 to adjust the timing of occurrence of a vertical synchronizing signal. The figure illustrates the progress of processing in the server 400 and the progress of processing in the image processing apparatus 200 in parallel with respect to a lateral axis representing time elapsed. A rectangle represents processing time per frame and a frame number is written in the rectangle. The server 400 performs drawing of an image, compression/encoding, and sending process at the frame rate of the moving image.

In other words, the vertical synchronizing signals of the server 400 occur at timings of Sv0, Sv1, Sv2, Sv3, . . . indicated by longitudinal lines in the figure, and, in response to these timings as starting points, processing of frames is started. The image processing apparatus 200 causes the data regarding each frame sent from the server 400 to be ready for displaying by performing decoding/decompression and applying various image processes thereto as needed and then starts output to the display panel in response to the vertical synchronizing signal coming immediately after.

The vertical synchronizing signals of the image processing apparatus 200 are caused to occur at a frequency higher than that of the vertical synchronizing signals of the server 400 at timings of Cv0, Cv1, Cv2, Cv3, . . . . In the figure, the frequency is twice as high as the frame rate of the moving image. For example, the image processing apparatus 200 acquires data regarding the "0"th frame at a time point t0, which is independent of the vertical synchronizing signals of the server 400, processes the data to be ready for displaying, and then starts output to the display panel in response to the vertical synchronizing signal "Cv3" coming immediately after.

As a result, an image of the "0"th frame is displayed at least between the vertical synchronizing signals "Cv3" to "Cv4." As long as data regarding the "1"st frame is ready for displaying at the vertical synchronizing signal "Cv4," the display control section 246 outputs the data to the display panel. Unless the data regarding the "1"st frame is ready for displaying at the vertical synchronizing signal "Cv4" as illustrated, the display control section 246 again outputs the data regarding the "0"th frame.

In either case, by virtue of the frequency of the vertical synchronizing signals being N times as high as the frame rate, displaying at the same frame rate as the original frame rate of the moving image can be achieved except in a case where a part of the frames fails to be displayed on time due to jitters during the processes. However, if a clock of the server 400 and a clock of the image processing apparatus 200 have errors, the frequency of the vertical synchronizing signals fails to be exactly N times as high as the frame rate and drop frame and unevenness of display time may occur as ever due to accumulation of the errors.

Accordingly, the processing rate control section 248 slightly adjusts the timings of occurrence of the vertical synchronizing signals as described above, thereby causing the period of processing on a frame-to-frame basis by the server 400 to match time given by multiplying the period of the vertical synchronizing signals by N. Specifically, the processing rate control section 248 compares an interval Ts between the generation time points of frames, which are sent from the server 400 along with data regarding the frames, and time Tc given by multiplying the period of the vertical synchronizing signals by N (in the case in the figure, doubling). Then, in response to a difference between the interval Ts and the time Tc being equal to or larger than a threshold, the processing rate control section 248 shifts the timings of occurrence of the vertical synchronizing signals to reduce the difference.

Here, the threshold may be zero or any other value. Such adjustment may be performed constantly or at a predetermined time interval on the basis of comparison in time between a plurality of frames. At this time, the processing rate control section 248 may gradually shift the timings of occurrence of the vertical synchronizing signals across the plurality of frames, thereby preventing display from being ruined due to a single huge change.

In addition, the processing rate control section 248 may measure a difference between a time point t1 when a frame gets ready for displaying and a time point of the vertical synchronizing signal Cv3 coming immediately after, i.e., time 16, and adjusts the timings of occurrence of the vertical synchronizing signals to cause the difference to reach a predetermined target value. Here, regarding the time when the frame gets ready for displaying, in a case where a process is to be performed by the image processing section 244, it is a time point of completion of the process, and otherwise, it is a time point of completion of the decoding/decompression process by the decoding/decompression section 242.

The processing rate control section 248 may measure the time 16 for each of a predetermined number of frames and determine the amount of shift on the basis of an average thereof or the like. As a result, the vertical synchronizing signals illustrated in the middle tier in the figure are adjusted to the vertical synchronizing signals illustrated in the lowermost tier. It should be noted that in the figure, the time point t1 is caused to match the vertical synchronizing signal Cv3. However, the vertical synchronizing signal may be actually caused to occur with delay by a predetermined time with consideration for jitters during the processes. In addition, the processing rate control section 248 may gradually shift the timings of occurrence of the vertical synchronizing signals across the plurality of frames, thereby preventing display from being ruined due to a single huge change.

According to the present embodiment described above, in a system in a form where a client, or image processing apparatus 200, receives data regarding an image generated by the server 400 and causes it to be displayed, the image processing apparatus 200 performs at least a part of processes at a rate higher than the frame rate of the moving image. This makes it possible to reduce the possibility of loss of opportunities of output to the display panel or delay in display due to mismatch of the timing of frame preparation irrespective of various fluctuations in time of processing inside the server 400, data transmission time, time of processing inside the image processing apparatus 200, or timings of occurrence of the vertical synchronizing signals in the server 400 and the image processing apparatus 200.

As a result, defects such as drop frame to be displayed and an unnatural motion of a target to be displayed can be reduced and low-delay display can be stably performed. In addition, the server 400 and the image processing apparatus 200 apply necessary processes in units of partial images each smaller than one frame and perform sequential output to the display panel, which makes it possible to process one frame in parallel and reduce delay time from drawing to display. Further, the timings of occurrence of the vertical synchronizing signals are adjusted such that a difference in processing period from the server 400 is eliminated and standby time from when the frame gets ready for displaying to when output to the display panel is performed is shortened, which makes it possible to achieve a stable and low-delay displaying.

Hereinabove, the present invention is described on the basis of the embodiments. The embodiments are merely by way of an example and it is understandable by those skilled in the art that various modification examples of combinations of the components and processing processes of the embodiments are possible and such modification examples are also within the scope of the present invention.

INDUSTRIAL APPLICABILITY

Therefore, the present invention is applicable to various equipment such as an image processing apparatus, a content processing device, an information terminal, a mobile terminal, a gaming device, a head mount display, a display device, and a television receiver, a system including any one of the above, etc.

REFERENCE SIGNS LIST

1: Image display system
100: Head mount display
200: Image processing apparatus
240: Image data acquirement section
242: Decoding/decompression section
243: Processing rate control section
244: Image processing section
245: Processing rate control section
246: Display control section
248: Processing rate control section
302: Flat panel display
400: Server
420: Image generation section
422: Compression/encoding section
424: Packetization section
426: Communication section

The invention claimed is:

1. An image processing apparatus comprising:
an image data acquirement section configured to acquire data regarding a frame constituting a moving image from an external device that is not integrally installed;
an image processing section configured to cause the data regarding the frame to be ready for displaying by applying a predetermined process to the data; and
a display control section configured to make reference to a frame rate of the moving image and provide more opportunities to output the data regarding the frame ready for displaying to a display panel than the frame rate of the moving image,
wherein the image processing section is configured to determine a computing power necessary for processing a frame without delay on a basis of a data amount of the frame to be processed acquired per unit of time, and to temporarily stop the process by shortening a processing time, and performing the predetermined process in a mode corresponding to the computing power.

2. The image processing apparatus according to claim 1, wherein the display
control section is configured to drive the display panel at a rate higher than the frame rate of the moving image.

3. The image processing apparatus according to claim 2, wherein the image processing section is configured to temporarily stop the predetermined process during a processing cycle with data regarding a frame to be processed not acquired.

4. The image processing apparatus according to claim 1, wherein, in a case where a timing when the data regarding the frame is caused to be ready for displaying by the image processing section is asynchronous with a timing of output to the display panel, the display control section is configured to output the data regarding the frame ready for displaying at a timing of output coming immediately after.

5. The image processing apparatus according to claim 1, wherein, in a case where time required for the image processing section to cause the data regarding the frame to be ready for displaying is variable, the display control section is configured to output the data regarding the frame ready for displaying at, among timings of output to the display panel, a timing coming immediately after.

6. The image processing apparatus according to claim 1 wherein, in a case where no data regarding a new frame ready for displaying is acquired at a timing of output to the display panel, the display control section is configured to again output data regarding a frame having been outputted.

7. The image processing apparatus according to claim 6, wherein the display control section is configured to cause an internal memory to hold data regarding a previous frame until the data regarding the new frame ready for displaying is acquired.

8. The image processing apparatus according to claim 1, wherein the image processing section is configured to cause the data regarding the frame to be ready for displaying by making reference to the frame rate of the moving image and repeating a processing cycle for each of frames including the frame at a rate determined on a basis of the frame rate and that is higher than the frame rate.

9. The image processing apparatus according to claim 1, wherein the image processing section includes a processor, a motion vector entropy calculator, and a pixel denoising filter and is configured to switch a mode of the computing power by changing a motion clock frequency of the processor, the motion vector entropy calculator, and the pixel denoising filter or changing the number of hard-wired blocks configured to operate in parallel.

10. The image processing apparatus according to claim 1, wherein
the image data acquirement section is configured to acquire the data regarding the moving image in units of partial images each smaller than one frame,
the image processing section is configured to apply the predetermined process to data regarding the partial images to generate data regarding the partial images for displaying; and
the display control section is configured to sequentially output the data regarding the partial images for displaying to the display panel.

11. The image processing apparatus according to claim 1, wherein the display control section is configured to cause a vertical synchronizing signal to occur at a frequency that is N times (N is an integer of two or more) as high as the frame rate of the moving image, thereby outputting the data regarding each of the frames to the display panel at the frequency.

12. The image processing apparatus according to claim 11, wherein the image data acquirement section is configured to acquire the data regarding frames including the frame and generation time points of the data from the external device, and the display control section is configured to adjust a timing of occurrence of the vertical synchronizing signal such that an interval between the generation time points of the frames matches time given by multiplying a period of the vertical synchronizing signal by the N.

13. The image processing apparatus according to claim 11, wherein the display control section is configured to measure time elapsed from a time point when the data regarding the frame is caused to be ready for displaying by the image processing section to a time point of occurrence of the vertical synchronizing signal coming immediately after and adjust a timing of occurrence of the vertical synchronizing signal such that the time reaches a target value.

14. The image processing apparatus according to claim 1, wherein the image processing section is configured to repeat the processing cycle at a rate given by multiplying the frame rate of the moving image by N', N' being a multiple of two or more.

15. An image processing method to be performed by an image processing apparatus, the method comprising:

acquiring data regarding a frame constituting a moving image from an external device that is not integrally installed;

causing the data regarding the frame to be ready for displaying by applying a predetermined process to the data; and making reference to a frame rate of the moving image and providing more opportunities to output the data regarding the frame ready for displaying to a display panel than the frame rate of the moving image, wherein the causing includes determining a computing power necessary for processing a frame without delay on a basis of a data amount of the frame to be processed acquired per unit of time, and to temporarily stop the process by shortening a processing time, and performing the predetermined process in a mode corresponding to the computing power.

16. A non-transitory, computer readable storage medium containing a computer program, which when executed by a computer, causes the computer to perform an image processing method by carrying out actions, comprising:

acquiring data regarding a frame constituting a moving image from an external device that is not integrally installed;

causing the data regarding the frame to be ready for displaying by applying a predetermined process to the data; and making reference to a frame rate of the moving image and providing more opportunities to output the data regarding the frame ready for displaying to a display panel than the frame rate of the moving image, wherein the causing includes determining a computing power necessary for processing a frame without delay on a basis of a data amount of the frame to be processed acquired per unit of time, and to temporarily stop the process by shortening a processing time, and performing the predetermined process in a mode corresponding to the computing power.

* * * * *